(12) United States Patent
Sundstrom et al.

(10) Patent No.: US 8,594,213 B2
(45) Date of Patent: Nov. 26, 2013

(54) SIGNAL PROCESSING DEVICE AND METHOD

(75) Inventors: Lars Sundstrom, Lund (SE); Filip Oredsson, Malmo (SE); Tony Petersson, Malmo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 290 days.

(21) Appl. No.: 13/001,765

(22) PCT Filed: Jun. 1, 2009

(86) PCT No.: PCT/EP2009/058260
§ 371 (c)(1),
(2), (4) Date: Dec. 28, 2010

(87) PCT Pub. No.: WO2010/000777
PCT Pub. Date: Jan. 7, 2010

(65) Prior Publication Data
US 2011/0122974 A1 May 26, 2011

Related U.S. Application Data

(60) Provisional application No. 61/081,549, filed on Jul. 17, 2008.

(30) Foreign Application Priority Data

Jul. 4, 2008 (EP) .................................... 08159677

(51) Int. Cl.
*H04K 1/10* (2006.01)
*H04L 27/28* (2006.01)

(52) U.S. Cl.
USPC ............ 375/260; 375/298; 375/259; 375/327

(58) Field of Classification Search
USPC .......................... 375/259, 260, 298, 299, 327
See application file for complete search history.

(56) References Cited

U.S. PATENT DOCUMENTS

| 7,253,761 | B1 | 8/2007 | Hoyos et al. |
| 8,068,563 | B2 * | 11/2011 | Nekhamkin et al. .......... 375/326 |
| 2005/0259724 | A1 | 11/2005 | Bergstrom et al. |
| 2006/0056554 | A1 * | 3/2006 | Lin et al. ....................... 375/350 |
| 2007/0218854 | A1 * | 9/2007 | Lawrence et al. ............. 455/310 |
| 2008/0239936 | A1 * | 10/2008 | Doberstein ................... 370/201 |

OTHER PUBLICATIONS

Harris, F. J. et al. "Digital Receivers and Transmitters Using Polyphase Filter Banks for Wireless Communications." IEEE Transactions on Microwave Theory and Techniques, vol. 51, No. 4, Apr. 2003.

* cited by examiner

*Primary Examiner* — Qutbuddin Ghulamali
(74) *Attorney, Agent, or Firm* — Coats & Bennett, P.L.L.C.

(57) ABSTRACT

A processing device processes an analog complex input signal representing a sequence of OFDM symbols in a radio-receiver. The processing device comprises processing paths, each comprising a complex mixer and an analog channel-selection filter. Furthermore, the processing device comprises an oscillator unit that provides local oscillator signals associated with the complex mixer of each processing path. A control unit determines, based on received control data, sub-carrier locations, within at least one individual OFDM symbol of the sequence, of one or more resource blocks allocated to the radio receiver. The control unit, for each of the at least one individual OFDM symbol, controls the local oscillator signals based on the determined subcarrier locations and passbands of the channel-selection filters such that each resource block allocated to the radio receiver is frequency translated by a complex mixer of the processing paths to appear within the passband of the following channel-selection filter.

15 Claims, 7 Drawing Sheets

SIGNAL PROCESSING DEVICE AND METHOD

TECHNICAL FIELD

The present invention relates to a processing device and method for processing an analog complex input signal. More particularly, the present invention relates to a processing device and method for processing an analog complex input signal representing a sequence of orthogonal frequency-division multiplexing symbols.

BACKGROUND

In order to facilitate wireless communication at increasing data rates, various new standards and systems for mobile communication are emerging. An example of an emerging cellular system is 3G Long Term Evolution (3G LTE). In 3G LTE, signals are transmitted using OFDM (Orthogonal Frequency Division Multiplexing) in a multiple access technique referred to as OFDMA (Orthogonal Frequency Division Multiple Access) in the downlink from a base station to a mobile terminal. Different groups of subcarriers, commonly referred to as resource blocks (RBs), of OFDM symbols transmitted from the base station can be allocated to different mobile terminals, whereby multiple access is obtained. 3G LTE systems may operate on radio-frequency (RF) channel bandwidths ranging from 1.25 MHz to 20 MHz. Moreover, data rates up to 100 Mb/s may be supported for the largest bandwidth.

The relatively high bandwidths and bit rates supported by communication systems, such as 3G LTE systems, sets relatively hard requirements e.g. on bandwidth and dynamic range of radio-receiver circuitry components. This in turn results in relatively high power consumption. However, in a mobile radio terminal, such as a mobile telephone, it is desirable to have relatively low power consumption, since the energy resources are normally limited by the capacity of a battery. In order to e.g. avoid excessively rapid draining of batteries in mobile radio terminals, there is a need for reducing the power dissipation in radio-receiver circuits.

SUMMARY

Accordingly, an object of the present invention is to facilitate a reduction of power dissipation in radio-receiver circuitry.

According to a first aspect, a processing device for processing an analog complex input signal representing a sequence of orthogonal frequency-division multiplexing (OFDM) symbols in a radio-receiver is provided. The processing device comprises a plurality of processing paths. Each processing path comprises a complex mixer and an analog channel-selection filter. The complex mixer is adapted to frequency translate the complex input signal based on a local oscillator signal associated with the complex mixer. The analog channel-selection filter is operatively connected to an output port of the complex mixer and arranged to filter an output signal of the complex mixer. The processing device further comprises an oscillator unit arranged to provide the local oscillator signal associated with the complex mixer of each processing path. Furthermore, the processing device comprises a control unit. The control unit is adapted to receive control data and determine, based on the control data, subcarrier locations, within at least one individual OFDM symbol of the sequence of OFDM symbols, of one or more resource blocks allocated to the radio receiver wherein a resource block defines a nonempty set of adjacent subcarriers for each of a nonempty set of consecutive OFDM symbols. Furthermore, the control unit is adapted to, for each of said at least one individual OFDM symbol, control the local oscillator signals associated with the complex mixers based on the determined subcarrier locations and passbands of the channel-selection filters such that each set of adjacent subcarriers, defined by resource blocks allocated to the radio receiver, within the OFDM symbol is frequency translated by a complex mixer of the processing paths to appear within the passband of the following channel-selection filter.

The complex input signal may be a complex baseband signal essentially centered around 0 Hz.

The channel-selection filter in each processing path may comprise a first low-pass filter for filtering an in-phase (I) component of the output signal of the complex mixer of the processing path and a second low-pass filter for filtering a quadrature (Q) component of the output signal of the complex mixer of the processing path. Furthermore, each processing path may comprise a first analog-to-digital converter (ADC) operatively connected to an output terminal of the first low-pass filter of the processing path for converting the filtered I component to a digital representation and a second ADC operatively connected to an output terminal of the second low-pass filter of the processing path for converting the filtered Q component to a digital representation.

Alternatively, the passbands of the channel-selection filters may be mutually essentially nonoverlapping and the processing device may comprise an adder circuit for adding output signals of the channel-selection filters for forming a compound complex signal. The channel-selection filter of one of the processing paths may comprise a first low-pass filter for filtering an I component of the output signal of the complex mixer of said one of the processing paths and a second low-pass filter for filtering a Q component of the output signal of the complex mixer of said one of the processing paths, whereas the channel-selection filters of the other processing paths may be complex bandpass filters. Alternatively, the channel-selection filter of each processing path may be a complex bandpass filter.

The processing device may be adapted to, for each of said at least one individual OFDM symbol, process the complex input signal such that the frequency span in the compound complex signal between the lowest and the highest frequency of frequency translated subcarriers allocated to the radio receiver is narrower than the corresponding frequency span in the complex input signal between the lowest and the highest frequency of subcarriers allocated to the radio receiver. The processing device may e.g. be adapted to, for each of said at least one individual OFDM symbol, process the complex input signal such that the compound complex signal comprises an essentially continuous frequency band comprising all of the subcarriers allocated to the radio receiver. The processing device may comprise ADCs for converting an I and a Q component of the compound complex signal to digital representations.

The control unit may be adapted to control the passbands of the channel-selection filters in response to the received control data.

According to a second aspect, a radio-receiver circuit comprises the processing device according to the first aspect.

According to a third aspect, an electronic apparatus comprises the processing device according to the first aspect. The electronic apparatus may e.g be, but is not limited to, a portable radio communication equipment, a mobile radio terminal, a mobile telephone, a communicator, an electronic organizer, a smartphone, or a computer.

According to a fourth aspect, a method of processing an analog complex input signal representing a sequence of OFDM symbols in a radio receiver is provided. The method comprises receiving control data and determining, based on the control data, sub-carrier locations, within at least one individual OFDM symbol of the sequence of OFDM symbols, of one or more resource blocks allocated to the radio receiver. A resource block defines a nonempty set of adjacent subcarriers for each of a nonempty set of consecutive OFDM symbols. Furthermore, the method comprises, for each of a plurality of processing paths, frequency translating the complex input signal in a complex mixer of the processing path based on a local oscillator signal associated with the complex mixer and filtering an output signal of the complex mixer in an analog channel-selection filter of the processing path. Moreover, the method comprises providing the local oscillator signal associated with the complex mixer of each processing path ($P_1$-$P_N$), and for each of said at least one individual OFDM symbol, controlling the local oscillator signals associated with the complex mixers based on the determined subcarrier locations and passbands of the channel-selection filters such that each set of adjacent subcarriers, defined by resource blocks allocated to the radio receiver, within the OFDM symbol is frequency translated by a complex mixer of the processing paths to appear within the passband of the following channel-selection filter.

It is an advantage of embodiments of the present invention that a reduction of bandwidth and/or dynamic range requirements on circuitry such as ADCs and/or filters in a radio receiver is facilitated. This may in turn be utilized for saving power.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
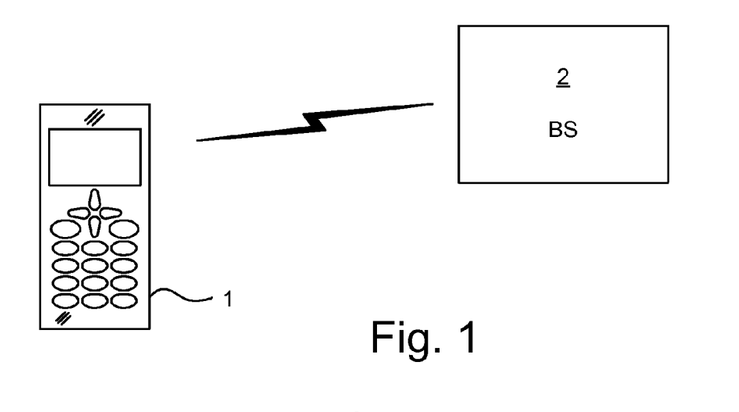
FIG. 1 schematically illustrates a mobile telephone arranged in communication with a base station.

FIG. 1 illustrates an environment where embodiments of the present invention may be employed. An electronic apparatus 1 with radio communication capabilities is adapted to communicate with a base station (BS) 2 via radio signals. In FIG. 1, the electronic apparatus 1 is illustrated as a mobile telephone. However, this is only an example and not intended to limit the scope of the present invention. For example, the electronic apparatus 1 may be, but is not limited to, a portable radio communication equipment, a mobile radio terminal, a communicator, i.e. an electronic organizer, a smartphone, or the like, or a personal computer (PC), e.g. a laptop.

The electronic apparatus 1 may e.g. be adapted for radio communication in 3G LTE (Long Term Evolution) communication systems, and possibly also one or more other types of communication systems, such as but not limited to one or more of GSM (Global System for Mobile communication), UMTS (Universal Mobile Telecommunications System), and one or more systems operating according to future standards compliant with e.g. IMT (International Mobile Telecommunication) Advanced.

Furthermore, a single BS 2 is used as illustration in FIG. 1. However, this is only an example. The electronic apparatus 1 may be arranged to be operatively connected to a plurality of BSs, operating within the same type or different types of communication systems. For example, the electronic apparatus 1 may be operatively connected to a plurality of BSs in order to facilitate so called soft handover (SHO) between BSs.

In this specification, an electronic apparatus, such as the electronic apparatus 1, which is adapted to communicate with a BS, such as the BS 2, via radio signals is referred to as a mobile terminal (MT).

In order to facilitate the understanding of embodiments of the present invention, 3G LTE will be used as an example throughout this specification. For the rest of this specification, 3G LTE will be referred to simply as LTE. In LTE, signals are transmitted using OFDM (Orthogonal Frequency Division Multiplexing) in a multiple access technique referred to as OFDMA (Orthogonal Frequency Division Multiple Access) in the downlink from the BS to the MT. Although LTE is used as an example, embodiments of the present invention may be employed in other types of OFDM communication systems, e.g. having similar multiple-access schemes as LTE, as well.

Figure 2:
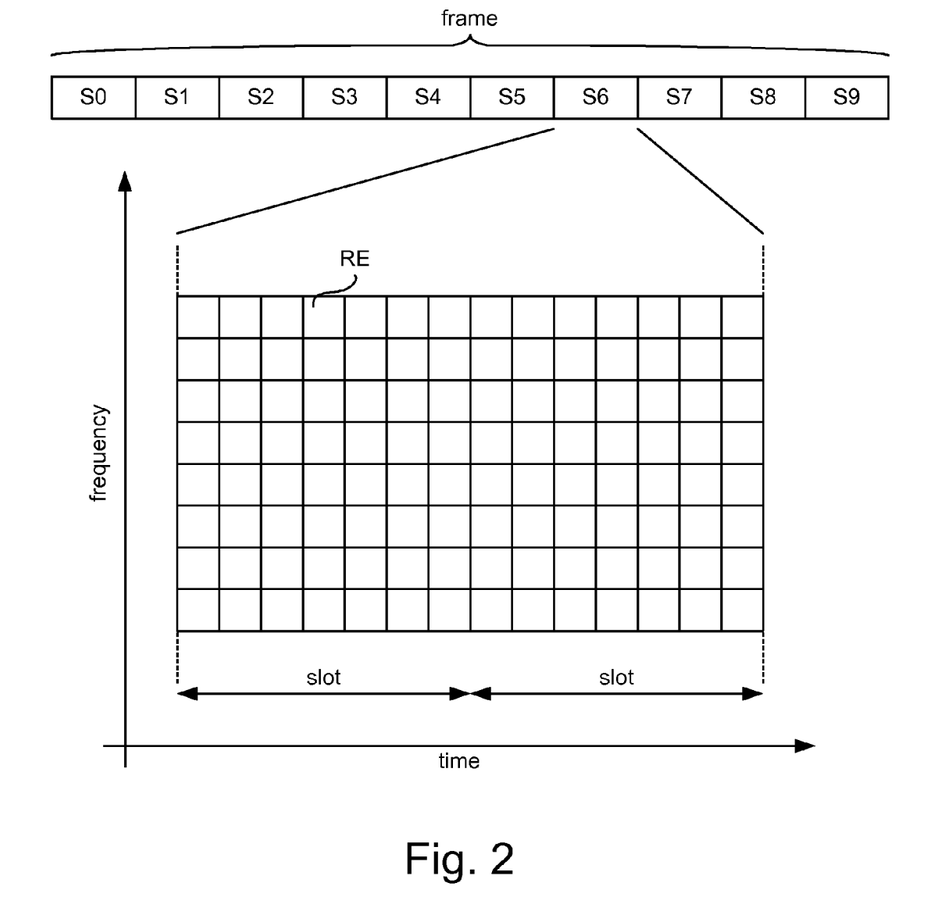
FIG. 2 schematically illustrates signal transmission timing in an LTE communication example.

FIG. 2 illustrates an example of signal timing for a downlink channel in an LTE system. According to the example illustrated in FIG. 2, data is transmitted in the downlink in frames, wherein each frame has a duration of 10 ms. Furthermore, each frame is divided into ten subframes S0-S9, each having a duration of 1 ms. Each subframe is in turn divided into two slots, each having a duration of 0.5 ms. One of the subframes, S6, is shown in more detail in FIG. 2. The view of the subframe S6 shown in FIG. 2 is valid also for the other subframes S0-S5 and S7-S9. In each subframe S0-S9, 12 or 14 OFDM symbols are transmitted in the downlink. The number of symbols depends on the length of the cyclic prefix of each OFDM symbol. In FIG. 2, the number of OFDM symbols in a subframe S0-S9 is 14. Each subframe S0-S9 is divided into a number of resource blocks (RBs). Each RB comprises a number of resource elements (REs), which are represented with squares (one of which is indicated with the reference sign RE) in the more detailed view of the subframe S6 in FIG. 2. Each RE corresponds to a unique subcarrier of a unique OFDM symbol in the subframe S0-S9. Hence, each column of REs in FIG. 2 corresponds to a single OFDM symbol. In FIG. 2, only eight REs are shown for each OFDM symbol. However, as indicated by the dotted lines in FIG. 2, each OFDM symbols may comprise more than eight REs.

Each RB covers a number of adjacent subcarriers in the frequency domain and a number of consecutive OFDM-symbol time intervals in the time domain. Typical numbers for LTE are that an RB covers 12 subcarriers in the frequency domain and one slot (i.e. corresponding to six or seven OFDM symbols depending on the length of the cyclic prefix) in the time domain, and hence consists of 72 or 84 REs. Although it has been suggested for LTE that the frequency band covered by an RB should be the same for each OFDM-symbol time interval covered by the RB (i.e. the RB makes up a rectangle of REs in the time/frequency grid of FIG. 2), embodiments of the invention are also applicable in a situation where the RB covers different frequency bands for different OFDM-symbol time intervals, i.e. the frequency location of the RB may vary between OFDM symbols. A more generic view, which covers also the latter case, is that an RB defines a nonempty set of adjacent subcarriers for each of a nonempty set of consecutive OFDM symbols.

An RB may be allocated to a particular MT of a plurality of MTs arranged in communication with a BS. Hence, different data may be transmitted from the BS to different MTs with the same OFDM symbol but on subcarriers belonging to different RBs allocated to the different MTs, whereby multiple channel access is provided.

In the first one, two, or three OFDM symbol(s) of each subframe S0-S9, control data is transmitted in the downlink from the BS to the MTs arranged in communication with the BS. The control data comprises information regarding which RBs of the subframe S0-S9 that are allocated to which MT. By decoding the control data, each MT may determine which subcarriers that carry data transmitted to that particular MT for each OFDM symbol.

Figure 3:
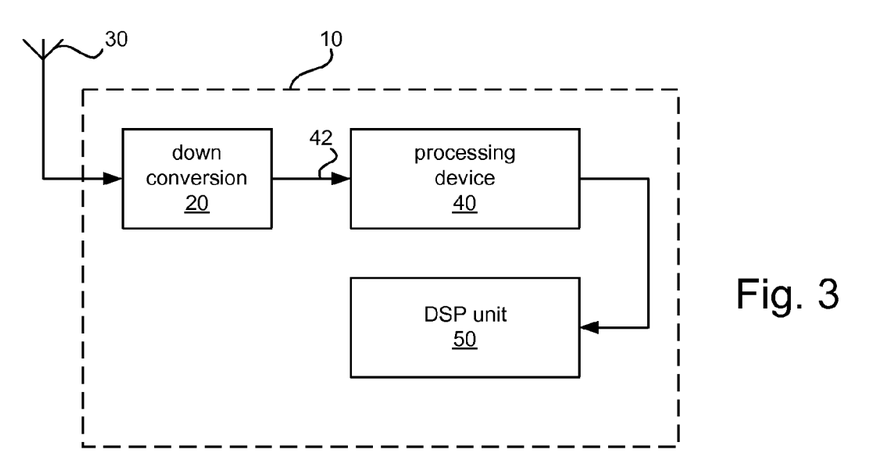
FIG. 3 is a block diagram of a radio receiver according to an embodiment of the present invention.

FIG. 3 shows a block diagram of a radio receiver 10 according to an embodiment of the present invention. The radio receiver 10 may e.g. be comprised in an MT. As illustrated in FIG. 3, the radio receiver 10 may comprise a downconversion unit 20 adapted to be operatively connected to an antenna 30 for receiving radio frequency (RF) signals. In FIG. 3, the antenna 30 is illustrated as being external to the radio-receiver 10. However, in other embodiments, the antenna 30 is comprised in the radio receiver 10. Furthermore, although a single antenna 30 is shown in FIG. 3, multiple antennas may be used, e.g. arranged in a multiple-input multiple-output (MIMO) or similar arrangement.

The downconversion unit 20 is adapted to downconvert a received RF signal to a lower frequency band, such as a baseband or an intermediate-frequency (IF) band, to facilitate further processing and demodulation of the received signal. The received RF signal represents a sequence of OFDM symbols, e.g. transmitted from a BS, such as the BS 2 (FIG. 1). The downconversion unit 20 may e.g. comprise one or more low-noise amplifiers (LNAs), filters, mixers, and/or local oscillators etc. for performing the downconversion according to methods well known in the art. The downconversion unit 20 is arranged to operate in quadrature for generating a pair of signals; an in-phase (I) component and a quadrature (Q) component. The I and Q components together represents a complex signal output from the downconversion unit 20. By means of using a complex signal representation with an I and a Q component, it is possible to distinguish between signal contents at positive and negative frequencies. Down-conversion in quadrature may e.g. be obtained by means of mixing with a first and a second local oscillator signal having a mutual phase difference of 90°, as is well known in the art. In the embodiments and examples presented in the following of this detailed description, the downconversion unit 20 is adapted to downconvert the received RF signal to a baseband, whereby the frequency range of the complex output signal from the downconversion unit that comprises the OFDM symbols includes 0 Hz, or DC. For example, in the complex output signal from the downconversion unit 20, the OFDM symbols may be centered or essentially centered around 0 Hz. However, this is only an example. According to some embodiments, the downconversion unit 20 is adapted to downconvert the received RF signal to an IF band that does not cover 0 Hz.

The radio receiver 10 further comprises a processing device 40 for processing an analog complex input signal representing a sequence of OFDM symbols. In FIG. 3, the processing device 40 is arranged to receive the complex output signal of the downconversion unit 20 on an input port 42 of the processing device 40 as the analog complex input signal. A single line is used in FIG. 3 to represent the connection between the downconversion unit 20 and the processing device 40. However, this is only for illustrative purposes; the processing device 40 is arranged to receive both the I and the Q component of the output from the downconversion unit 20. Moreover, in FIG. 3, the connection between the downconversion unit 20 and the processing device 40 is illustrated as a direct connection. However, in other embodiments, one or more intervening elements, such as but not limited to one or more buffer amplifiers, filters, and/or variable gain amplifiers (VGAs) may be present in the path between the downconversion unit 20 and the processing device 40.

According to embodiments of the invention, the processing device 40 is adapted to process the complex input signal of the processing device based on control data (e.g. the control data in the first OFDM symbol(s) of a subframe in LTE) indicating subcarrier locations of RBs allocated to the radio receiver 10 such that bandwidth requirements and/or dynamic range requirements of radio-receiver components are relaxed, whereby a reduced power dissipation is facilitated. Examples of such processing is given below in the context of specific embodiments.

Furthermore, according to the embodiment illustrated in FIG. 3, the radio receiver 10 comprises a digital signal processing (DSP) unit 50 for further processing of output signals from the processing device 40, e.g. for demodulation and/or recovery of received data. As will be illustrated in the context of specific embodiments, the processing device 40 may comprise one or more analog-to-digital converters (ADCs) for converting analog signals to a digital representation suitable for processing in the DSP unit 50. Alternatively, one or more ADCs (not shown) may be inserted in the path between the processing device 40 and the DSP unit 50. Further alternatively, the DSP unit 50 may comprise an analog interface (not shown) comprising one or more ADCs. The DSP unit 50 may e.g. comprise, be, or be comprised in a digital baseband circuit (DBB, not shown).

Figure 4:
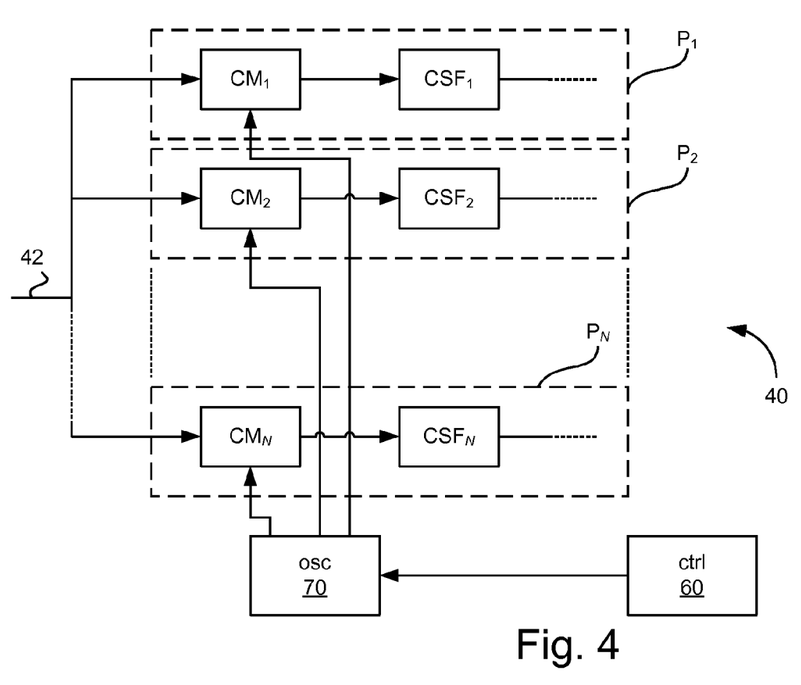
FIG. 4 is a block diagram of a processing device according to an embodiment of the present invention.

FIG. 4 is a block diagram of an embodiment of the processing device 40. According to the embodiment, the processing device 40 comprises a plurality of processing paths $P_1$-$P_N$. Each processing path $P_1$-$P_N$ comprises a complex mixer (CM)

$CM_1$-$CM_N$ and an analog channel-selection filter (CSF) $CSF_1$-$CSF_N$. For simplicity, single lines are used in FIG. 4 to represent connections to input and output ports of the CMs $CM_1$-$CM_N$ and the CSFs $CSF_1$-$CSF_N$, although the signals transferred over these connections are complex signals, having an I and a Q component. Furthermore, although the connections between each CM $CM_1$-$CM_N$ and the following CSF $CSF_1$-$CSF_N$ are illustrated as direct connections in FIG. 4, one or more intervening elements, such as but not limited to one or more buffer amplifiers, filters, and/or VGAs may be present in the path between each CM $CM_1$-$CM_N$ and the following CSF $CSF_1$-$CSF_N$.

Each CM $CM_1$-$CM_N$ is adapted to frequency translate the complex input signal of the processing device 40 based on a local oscillator (LO) signal associated with the CM $CM_1$-$CM_N$. Furthermore, each CSF $CSF_1$-$CSF_N$ is arranged to filter an output signal of the preceding CM $CM_1$-$CM_N$. The output signals from the CSFs $CSF_1$-$CSF_N$ may be output signals of the processing device 40, e.g. in embodiments where ADCs are inserted in the path between the processing device 40 and the DSP unit 50 (FIG. 3) or the ADCs are comprised in an analog interface of the DSP unit 50. Alternatively, as indicated by the dotted lines in FIG. 4, the processing device may comprise additional elements (not shown in FIG. 4) for further processing of the output signals from the CSFs $CSF_1$-$CSF_N$.

Furthermore, according to the embodiment illustrated in FIG. 4, the processing device 40 comprises a control unit 60 adapted to receive control data. Moreover, the control unit 60 is adapted to determine, based on the control data, sub-carrier locations of one or more RBs allocated to the radio receiver 10. The control data may e.g. be the control data in the first OFDM symbol(s) of a subframe in LTE, which indicates subcarrier locations of RBs allocated to the radio receiver 10.

In addition, the embodiment of the processing device 40 illustrated in FIG. 4 comprises an oscillator unit 70. The oscillator unit 70 is arranged to provide the LO signal associated with the CM $CM_1$-$CM_N$ of each processing path $P_1$-$P_N$. Each CM $CM_1$-$CM_N$ requires an I and a Q LO signal, having a mutual phase difference of 90°, for its operation. Hence, the LO signal provided to each CM $CM_1$-$CM_N$ is a complex LO signal having an I and a Q component. For simplicity, single lines are used in FIG. 4 to represent the connections between the oscillator unit 70 and the CMs $CM_1$-$CM_N$.

Furthermore, the control unit 60 is operatively connected to the oscillator unit 70 for controlling the generation of the LO signals to the CMs $CM_1$-$CM_N$. For example, the control unit 60 may be adapted to control the frequency and/or mutual phase relationship between the I and Q component of each LO signal.

With the structure of the processing device 40 illustrated in FIG. 4, it is possible to continuously track subcarrier locations of RBs allocated to the radio receiver 10. By controlling the generation of the LO signals from the control unit 60, the complex input signal to the processing device 40 can be processed in the processing paths $P_1$-$P_N$ such that each subcarrier allocated to the radio receiver 10 (i.e. each subcarrier belonging to an RB allocated to the radio receiver 10) appears in an output signal of a CSF $CSF_1$-$CSF_N$ of the processing paths $P_1$-$P_N$, whereas some or all of the subcarriers that are not allocated to the radio receiver 10 (e.g. unallocated subcarriers or subcarriers allocated to another MT) can be suppressed in the CSFs $CSF_1$-$CSF_N$. Hence, the total bandwidth of the signals output from the CSFs $CSF_1$-$CSF_N$ can be made smaller than the bandwidth of the complex input signal to the processing device 40 (unless, of course, the whole OFDM symbol is allocated to the radio receiver 10). Thereby, the overall bandwidth requirements on circuitry following after the CSFs $CSF_1$-$CSF_N$ in the radio receiver 10 are relaxed compared with if this circuitry were to operate on the full bandwidth of the OFDM symbol. This, in turn, facilitates a reduction of power dissipation in the radio receiver 10. Furthermore, the subcarriers that are not allocated to the radio receiver 10 can be considered as interference signals in the radio receiver 10. Since some or all of these subcarriers can be filtered out, dynamic range requirements on circuitry following after the CSFs $CSF_1$-$CSF_N$ in the radio receiver 10 can also be relaxed. This, in turn, also facilitates a reduction of power dissipation in the radio receiver 10.

Depending on e.g. the current number of RBs allocated to the radio receiver 10, all of the processing paths $P_1$-$P_N$ may not be needed all the time. Currently unused processing paths $P_1$-$P_N$ may e.g. be disabled or powered off for saving power.

In order to facilitate reception of the first OFDM symbol(s) of a subframe S0-S9 in LTE, wherein the control data is comprised, the radio receiver 10 may have a default setting that facilitates reception of the full OFDM symbol bandwidth. For example, in the default setting, the processing paths $P_1$-$P_N$ of the processing device 40, or a subset thereof, may be configured to pass all subcarriers of the OFDM symbol. Alternatively, the radio receiver 10 may comprise a separate dedicated processing path (not shown), e.g. arranged in parallel with the processing device 40, adapted to receive the full OFDM symbol. This separate dedicated processing path may be enabled in the default setting and disabled, or powered off, otherwise, whereas the processing device 40, or parts thereof, may be disabled, or powered off, in the default setting and enabled otherwise.

After having received the first OFDM symbol(s), in which the control data is comprised, the control unit 60 may need additional time to decode the control data. Therefore, the default setting may need to be used for the reception of a few OFDM symbols that follow after the first OFDM symbol(s), in which the control data is comprised, before the control data has been decoded. Having decoded the control data, the control unit 60 is able to control the generation of the LO signals based on the control data to facilitate a reduction of power dissipation as outlined above. In LTE, it will normally be possible for the control-unit 60 to complete the decoding of the control data at least by the end of the first slot of a subframe S0-S9. Hence, normally, it will be possible for the control unit 60 to control the generation of the LO signals based on the control data at least during the second slot of the subframe S0-S9.

Accordingly, in embodiments of the present invention, the control unit 60 is adapted to determine, based on the control data, subcarrier locations, within at least one individual OFDM symbol of the sequence of OFDM symbols, of one or more RBs allocated to the radio receiver 10. Furthermore, for each of said at least one individual OFDM symbol, the control unit 60 is adapted to control the LO signals based on the determined subcarrier locations and passbands of the CSFs $CSF_1$-$CSF_N$ such that each set of adjacent subcarriers, defined by RBs allocated to the radio receiver 10, within the OFDM symbol is frequency translated by a CM $CM_1$-$CM_N$ of the processing paths $P_1$-$P_N$ to appear within the passband of the following CSF $CSF_1$-$CSF_N$.

Figure 5:
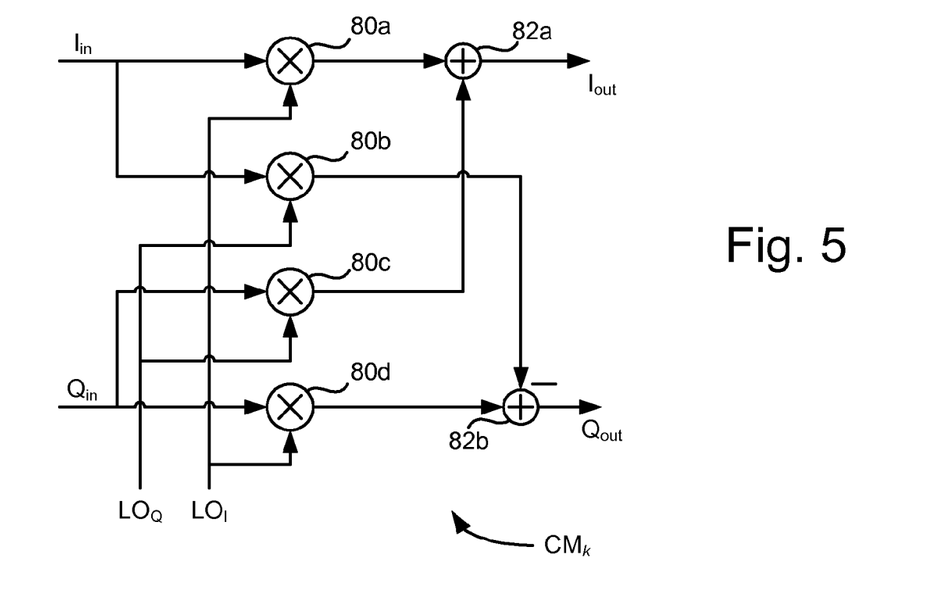
FIG. 5 is a block diagram of a complex mixer according to an embodiment of the present invention.

FIG. 5 is a block diagram of a CM $CM_k$ according to an embodiment of the present invention. Each of the CMs $CM_1$-$CM_N$ (FIG. 4) of the processing device 40 may be implemented as the CM $CM_k$ in FIG. 5. The I and Q components of the input signal enter the CM $CM_k$ at labels $I_{in}$ and $Q_{in}$, respectively. Similarly, the I and Q components of the output signal are output from the CM $CM_k$ at labels $I_{out}$ and $Q_{out}$, respectively. The CM $CM_k$ comprises four mixer elements 80a-d and two adder elements 82a-b. The I component of the input signal is fed to the mixer elements 80a and b, and the Q component of the input signal is fed to the mixer elements 80c and d. The mixer elements 80a and d are driven by an I component, $LO_I$, of an LO signal, and the mixer elements 80b and c are driven by a Q component, $LO_Q$, of the LO signal. The adder element 82a generates the I component of the output signal by adding the output signals from the mixer elements 80a and c, and the adder element 82b generates the Q component of the output signal by subtracting the output signal from the mixer element 80b from the output signal of the mixer element 80d.

Let $f_{LO}$ denote the frequency of the LO signal. If $LO_Q$ is 90° ahead of $LO_I$, the resulting frequency translation is negative, i.e. the translation is such that the signal content at $+f_{LO}$ in the input signal is translated to 0 Hz. On the other hand, if $LO_I$ is 90° ahead of $LO_Q$, the resulting frequency translation is positive, i.e. the translation is such that the signal content at $-f_{LO}$ in the input signal is translated to 0 Hz. Hence, the control unit 60 (FIG. 4) can control whether the CM $CM_k$ should perform a positive or negative frequency translation by controlling the sign of the mutual phase difference between $LO_I$ and $LO_Q$. For example, swapping between a positive and a negative frequency translation (or vice versa) can be obtained by changing the sign of either $LO_I$ or $LO_Q$. Alternatively, a swap between a positive and a negative frequency translation (or vice versa) can be obtained by swapping $LO_I$ and $LO_Q$.

Figure 6:
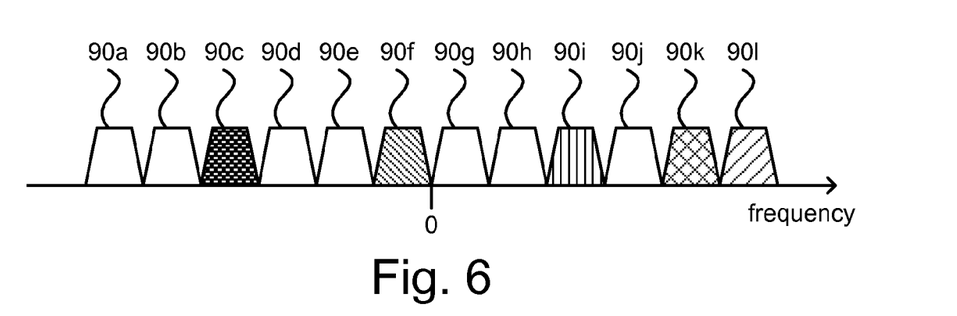
FIG. 6 schematically illustrates partitioning, in the frequency domain, of a complex input signal to a processing device according to an example.

FIG. 6 illustrates schematically partitioning, in the frequency domain, of a complex input signal to the processing device 40 according to an example, which is used in the following to illustrate various embodiments of the present invention. Each box labeled 90a-l represents a set of adjacent subcarriers, defined by an RB, of an OFDM symbol. Although the RBs normally extend in time over a number of consecutive OFDM symbols, and FIG. 6 only illustrates the situation for a single OFDM symbol, the boxes 90a-l are in the following referred to as "the RBs 90a-l" for simplicity. In FIG. 6, the OFDM symbol spans over 12 RBs. However, this is only an example used for illustration and by no means limiting for the invention. Furthermore, in FIG. 6, the OFDM symbol is centered around 0 Hz, i.e. the complex input signal to the processing device 40 is a baseband signal. However, as described above, in other embodiments, the complex input signal to the processing device 40 need not necessarily be a baseband signal, but can be centered around a frequency other than 0 Hz.

According to the example illustrated in FIG. 6, the RBs 90c, f, i, k, and l are allocated to the radio receiver 10. These RBs are filled with various patterns in FIG. 6 for illustrative purposes. The other RBs, i.e. 90a, b, d, e, g, h, and j are not allocated to the radio receiver 10.

Figure 7:
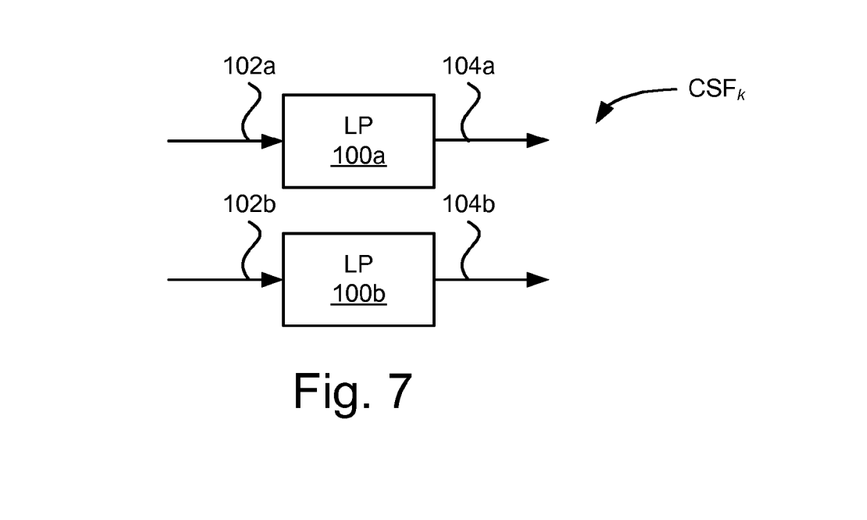
FIG. 7 is a block diagram of a channel-selection filter according to an embodiment of the present invention.

FIG. 7 is a block diagram of an embodiment of a CSF $CSF_k$ according to an embodiment. According to this embodiment, the CSF $CSF_k$ comprises a first and a second lowpass (LP) filter 100a and b. The LP filter 100a is arranged to receive the I component of the output signal of the preceding CM $CM_k$ on an input terminal 102a and output the I component of the output signal of the CSF $CSF_k$ on an output terminal 104a. Similarly, the LP filter 100b is arranged to receive the Q component of the output signal of the preceding CM $CM_k$ on an input terminal 102b and output the Q component of the output signal of the CSF $CSF_k$ on an output terminal 104a.

According to an embodiment, the CSF $CSF_1$-$CSF_N$ in each processing path $P_1$-$P_N$ is implemented as the CSF $CSF_k$ in FIG. 7. That is, the CSF $CSF_1$-$CSF_N$ in each processing path $P_1$-$P_N$ comprises a first LP filter 100a for filtering the I component of the output signal of the CM $CM_1$-$CM_N$ of the processing path $P_1$-$P_N$ and a second LP filter 100b for filtering the Q component of the output signal of the CM $CM_1$-$CM_N$ of the processing path $P_1$-$P_N$. Operation of this embodiment is illustrated in FIGS. 8a-d. FIGS. 8a-d illustrate output signals from CMs and CSFs in the frequency domain according to an example, in which the complex input signal illustrated in FIG. 6 is input to the processing device. In the example, four processing paths, $P_1$-$P_4$, are utilized for processing the complex input signal. In the event that the processing device 40 comprises more than four processing paths $P_1$-$P_N$, the other processing paths (i.e. $P_5$-$P_N$) may be disabled or powered off. For readability, only the RBs 90c, f, i, k, and l allocated to the radio receiver 10 are provided with reference signs in FIGS. 8a-d, whereas the reference signs 90a, b, d, e, g, h, and j are omitted in FIGS. 8a-d.

Figure 8A:
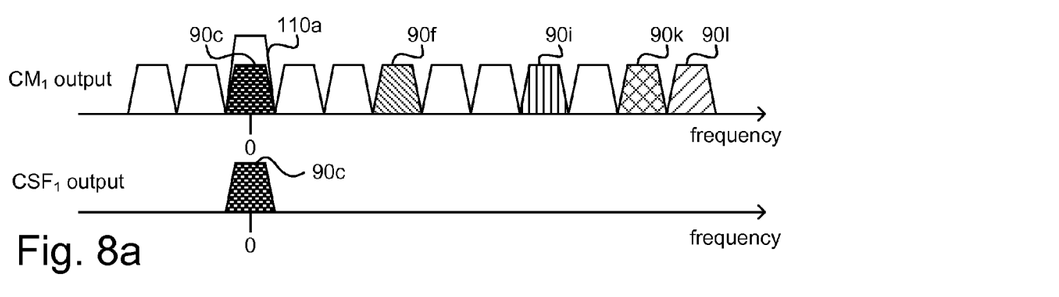
FIGS. 8a-d illustrate output signals from complex mixers and channel-selection filters in the frequency domain according to an example.

FIG. 8a illustrates the output signals from the CM $CM_1$ and the CSF $CSF_1$. FIG. 8a also includes a schematic illustration of the passband 110a of the CSF $CSF_1$. The control unit 60 (FIG. 4) controls the LO signal associated with the CM $CM_1$ such that the RB 90c, in the output signal from the CM $CM_1$, is centered around 0 Hz and appears within the passband 110a of the CSF $CSF_1$. In the output signal from the CSF $CSF_1$, only the RB 90c is present, whereas the other RBs are removed (or at least significantly attenuated) by the CSF $CSF_1$. Since the RB 90c appears at a negative frequency in the complex input signal (see FIG. 6), the control unit 60 should control the LO signal associated with the CM $CM_1$ such that the phase of the I component of the LO signal is 90° ahead of the phase of the Q component.

Figure 8B:
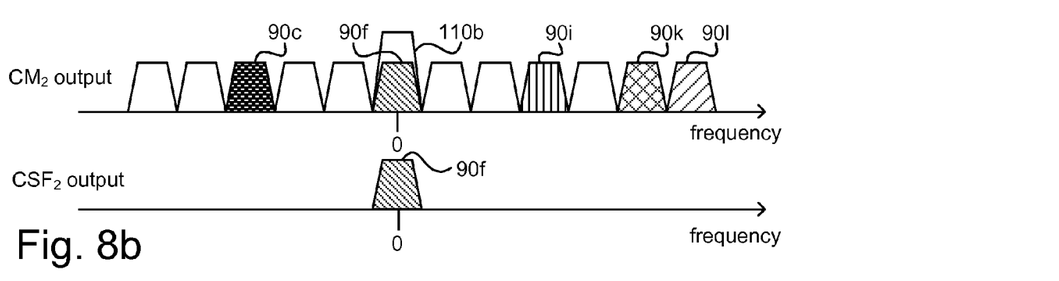

FIG. 8b illustrates the output signals from the CM $CM_2$ and the CSF $CSF_2$. FIG. 8b also includes a schematic illustration of the passband 110b of the CSF $CSF_2$. The control unit 60 (FIG. 4) controls the LO signal associated with the CM $CM_2$ such that the RB 90f, in the output signal from the CM $CM_2$, is centered around 0 Hz and appears within the passband 110b of the CSF $CSF_2$. In the output signal from the CSF $CSF_2$, only the RB 90f is present, whereas the other RBs are removed (or at least significantly attenuated) by the CSF $CSF_2$. Since the RB 90f appears at a negative frequency in the complex input signal (see FIG. 6), the control unit 60 should control the LO signal associated with the CM $CM_2$ such that the phase of the I component of the LO signal is 90° ahead of the phase of the Q component.

Figure 8C:
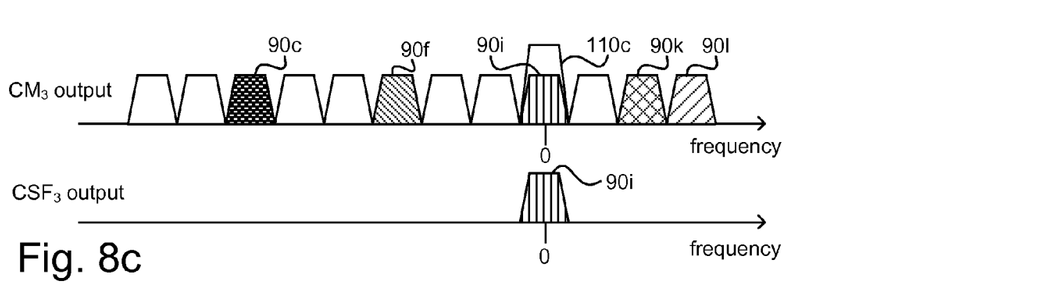

FIG. 8c illustrates the output signals from the CM $CM_3$ and the CSF $CSF_3$. FIG. 8c also includes a schematic illustration of the passband 110c of the CSF $CSF_3$. The control unit 60 (FIG. 4) controls the LO signal associated with the CM $CM_3$ such that the RB 90i, in the output signal from the CM $CM_3$, is centered around 0 Hz and appears within the passband 110c of the CSF $CSF_3$. In the output signal from the CSF $CSF_3$, only the RB 90i is present, whereas the other RBs are removed (or at least significantly attenuated) by the CSF $CSF_3$. Since the RB 90i appears at a positive frequency in the complex input signal (see FIG. 6), the control unit 60 should control the LO signal associated with the CM $CM_3$ such that the phase of the Q component of the LO signal is 90° ahead of the phase of the I component.

Figure 8D:
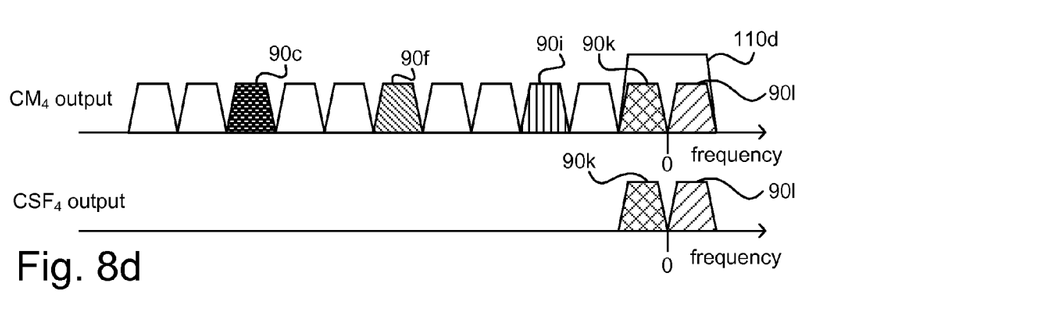

FIG. 8d illustrates the output signals from the CM $CM_4$ and the CSF $CSF_4$. FIG. 8d also includes a schematic illustration of the passband 110d of the CSF $CSF_4$. The control unit 60 (FIG. 4) controls the LO signal associated with the CM $CM_4$ such that the combination of the RBs 90k and l, in the output signal from the CM $CM_3$, is centered around 0 Hz and appears within the passband 110d of the CSF $CSF_4$. In the output signal from the CSF $CSF_4$, only the RBs 90k and l are present, whereas the other RBs are removed (or at least significantly attenuated) by the CSF CSF$_4$. Since the RBs 90$k$ and $l$ appear at positive frequencies in the complex input signal (see FIG. 6), the control unit 60 should control the LO signal associated with the CM CM$_4$ such that the phase of the Q component of the LO signal is 90° ahead of the phase of the I component.

According to some embodiments, the LP filters 100$a$ and $b$ in the CSFs CSF$_1$-CSF$_N$ are fixed filters, i.e. filters with fixed frequency responses. For example, each CSF CSF$_1$-CSF$_N$ may comprise LP filters 100$a$ and $b$ with a fixed bandwidth. The fixed bandwidth (i.e. the total bandwidth counting both positive and negative frequencies) may e.g. be n·f$_{RB}$, where f$_{RB}$ denotes the bandwidth of one RB and n is a fixed integer. The integer n may be the same for all CSFs CSF$_1$-CSF$_N$ or different for some or all CSFs CSF$_1$-CSF$_N$. For example, in the examples illustrated in FIGS. 8$a$-$d$, n would be 1 for CSF$_1$-CSF$_3$ and 2 for CSF$_4$. Based on awareness of the (fixed) bandwidths of the different CSFs and the subcarrier locations of the RBs allocated to the radio receiver 10, the control unit 60 may be adapted to control the LO signals associated with the CMs CM$_1$-CM$_N$ such that the different RBs processed in suitable processing paths P$_1$-P$_N$. For example, again with reference to the example illustrated in FIGS. 8$a$-$d$, since the RBs 90$k$ and $l$ are two adjacent RBs allocated to the radio receiver 10, it is suitable to process these RBs in a common processing path with a total CSF bandwidth of 2·f$_{RB}$, such as P$_4$ in this example. On the other hand, since the RBs 90$c$, $f$, and $i$ are single "isolated" RBs allocated to the radio receiver, it is suitable to process these RBs in separate processing paths, each having a total CSF bandwidth of 1·f$_{RB}$, such as P$_1$, P$_2$, and P$_3$ in this example.

According to other embodiments, the LP filters 100$a$ and $b$ in some or all of the CSFs CSF$_1$-CSF$_N$ are controllable filters, i.e. filters with controllable frequency responses, which e.g. may be controlled from the control unit 60 (FIG. 4). For example, these filters may have controllable bandwidths. The controllable bandwidth (i.e. the total bandwidth counting both positive and negative frequencies) of such a filter may e.g. be given by n·f$_{RB}$, where n is a controllable integer. Again with reference to the examples illustrated in FIGS. 8$a$-$d$, the control unit may control n to be 1 for CSF$_1$-CSF$_3$ and 2 for CSF$_4$.

Figure 9:
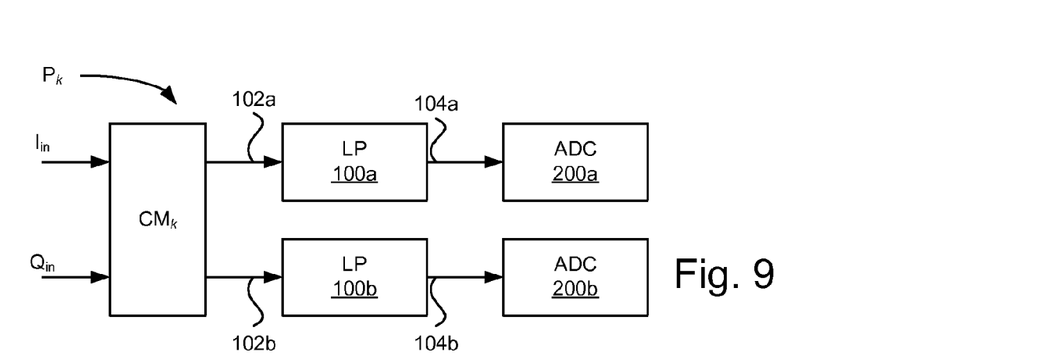
FIG. 9 is a block diagram of a processing path of a processing device according to an embodiment of the present invention.

FIG. 9 is a block diagram of an embodiment of processing path P$_k$, in which the CSF CSF$_k$ comprises a first and a second LP filter 100$a$ and $b$ arranged to filter the I and the Q component, respectively, of the output signal from the CM CM$_k$. According to this embodiment, the processing path P$_k$ comprises a first and a second ADC 200$a$ and $b$, arranged to convert the filtered I and Q component, respectively, to digital representations. Said digital representations may be output from the processing device 40, e.g. to the DSP unit 50 (FIG. 3). Although the ADCs 200$a$ and $b$ are illustrated in FIG. 9 as being directly connected to the LP filters 100$a$ and $b$, respectively, one or more intervening elements, such as but not limited to one or more additional filters, buffer amplifiers, and/or VGAs may be included in the paths between the LP filters 100$a$ and $b$ and the following ADCs 200$a$ and $b$.

According to some embodiments, the processing device 40 is instead arranged to output an analog signal. Then, the ADCs 200$a$ and $b$ may be omitted in the processing path P$_k$. Instead, the ADCs 200$a$ and $b$ may e.g. be inserted in the signal path between the processing device 40 and the DSP unit 50 (FIG. 3), or comprised in an analog interface of the DSP unit 50.

Figure 10:
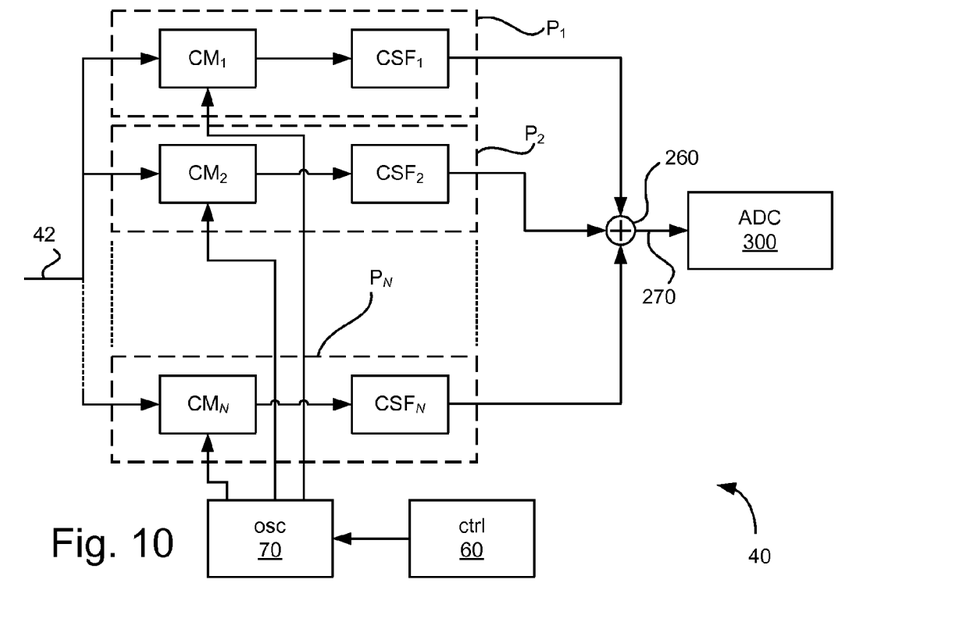
FIG. 10 is a block diagram of a processing device according to an embodiment of the present invention.

FIG. 10 is a block diagram of an embodiment of the processing device 40. According to this embodiment, the processing device 40 comprises an adder circuit 260. The adder circuit 260 is operatively connected to the CSFs CSF$_1$-CSF$_N$ for adding the complex output signals from the CSFs CSF$_1$-CSF$_N$, thereby forming a compound complex signal on an output terminal 270 of the adder circuit 260. In order to avoid interference between the output signals from the different CSFs CSF$_1$-CSF$_N$ in the compound output signal, the passbands of the CSFs CSF$_1$-CSF$_N$ are nonoverlapping, or essentially nonoverlapping. A small amount of overlap may be acceptable in some cases, but this may need to be verified from implementation to implementation, e.g. based on measurements and/or computer simulations.

As illustrated in FIG. 10, the processing device 40 may comprise ADCs 300 for converting the compound complex signal to a digital representation. The box 300 in FIG. 10 is illustrated as a single ADC. However, it represents separate ADCs for converting the I and Q components of the compound complex signal to digital representations. Said digital representations may be output from the processing device 40, e.g. to the DSP unit 50 (FIG. 3). As has been described above, the processing device 40 may be arranged to output an analog signal. Then, the ADCs 300 may be omitted in the processing device. Instead, the ADCs 300 may e.g. be inserted in the signal path between the processing device 40 and the DSP unit 50 (FIG. 3), or comprised in an analog interface of the DSP unit 50.

Although the adder circuit 260 is illustrated in FIG. 10 as being directly connected to the CSFs CSF$_1$-CSF$_N$ and the ADCs 300, one or more intervening elements, such as but not limited to one or more filters, buffer amplifiers, and/or VGAs may be included in the paths between the CSFs CSF$_1$-CSF$_N$ and the adder circuit 260 and/or the signal paths between the adder circuit 260 and the ADCs 300.

Figure 11:
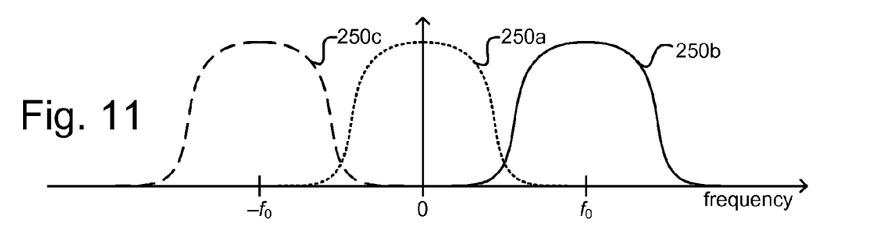
FIG. 11 show magnitude responses of a lowpass reference filter and complex bandpass filters according to an example.

Some or all of the CSFs CSF$_1$-CSF$_N$ in the embodiment illustrated in FIG. 10 may be implemented as complex bandpass (BP) filters. A complex BP filter is a BP filter adapted to receive a complex input signal, having an I and a Q component, and output a complex output signal, also having an I and a Q component. Furthermore, the complex BP filter has a BP characteristic with a passband located either at positive or negative frequencies. That is, the complex BP filter can be considered to be a single side-band bandpass filter, and is capable of distinguishing between signal contents at positive and negative frequencies. A complex BP filter can be synthesized starting from a real-valued LP reference filter. The transfer function of the reference filter is transformed by means of a frequency translation. This is schematically illustrated in FIG. 11. In FIG. 11, the magnitude of the transfer function 250$a$ of an LP reference filter is plotted, together with the magnitude of the transfer functions 250$b$ and $c$ of two complex BP filters generated based on the LP reference filter. In the following, H(j2πf) is used for denoting the transfer function 250$a$ of the LP reference filter. The transfer function 250$b$ has the passband center frequency f$_0$. The frequency translation for generating the transfer function 250$b$ from the transfer function 250$a$ is:

$$H(j2\pi f) \rightarrow H(j2\pi(f-f_0))$$

Similarly, the transfer function 250$c$ has the passband center frequency −f$_0$. The frequency translation for generating the transfer function 250$c$ from the transfer function 250$a$ is:

$$H(j2\pi f) \rightarrow H(j2\pi(f+f_0))$$

Complex BP filters are known in the art, e.g. described in the article P. Andreani et al, "A CMOS gm-C Polyphase Filter with High Image Band Rejection", *Proceedings of 26th European Solid-State Circuits Conference (ESSCIRC'00)*, pp. 244-247, September 2000. Therefore, details thereof will not be further described in this specification.

Figure 12A:
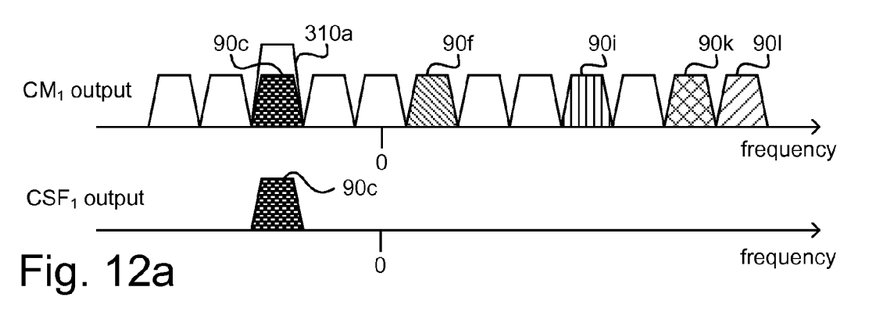
FIGS. 12a-e illustrate output signals from complex mixers and channel-selection filters and a compound signal in the frequency domain according to an example.
Figure 12B:
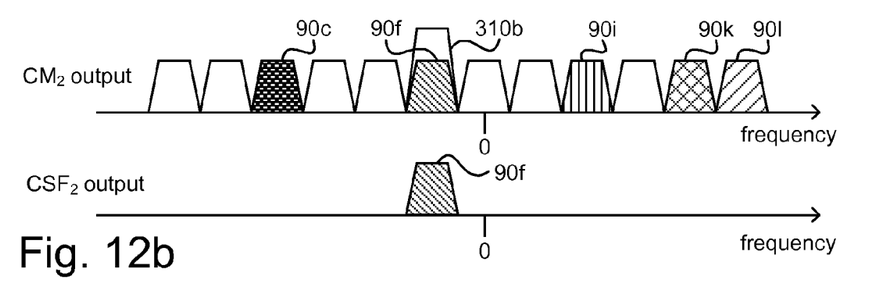
Figure 12C:
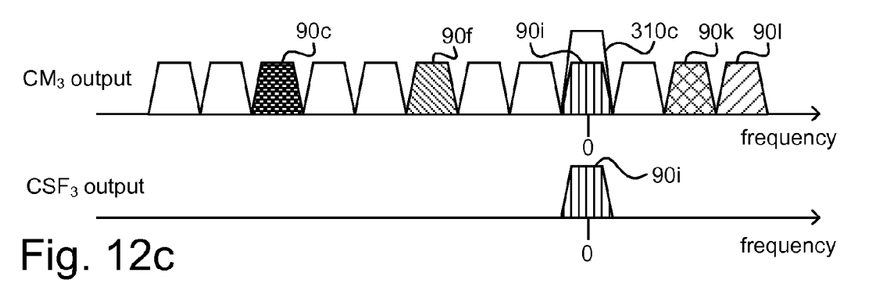
Figure 12D:
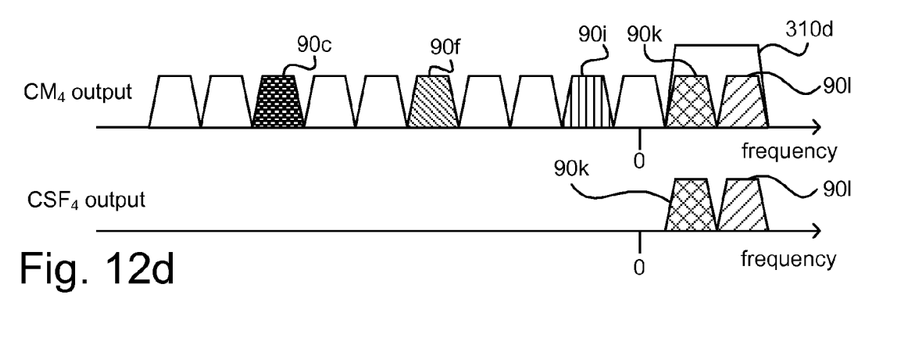
Figure 12E:
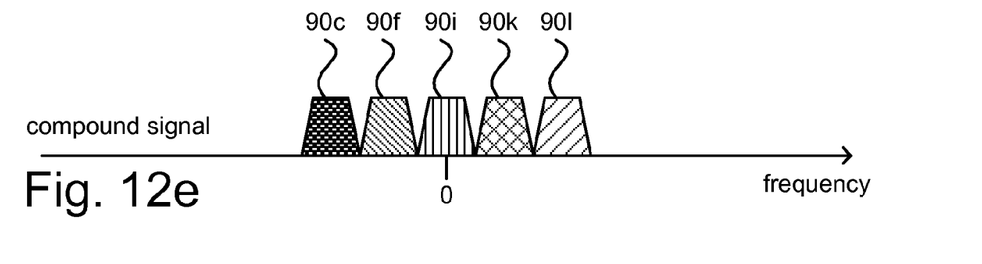

Operation of the embodiment shown in FIG. 10 is illustrated in FIGS. 12a-e. FIGS. 12a-d illustrate output signals from CMs and CSFs in the frequency domain according to an example, in which the complex input signal illustrated in FIG. 6 is input to the processing device 40. FIG. 12e illustrates the compound complex signal output from the adder circuit 260 in the frequency domain. In the example, four processing paths, $P_1$-$P_4$, are utilized for processing the complex input signal. In the event that the processing device 40 comprises more than four processing paths $P_1$-$P_N$, the other processing paths (i.e. $P_5$-$P_N$) may be disabled or powered off. For readability, only the RBs 90c, f, i, k, and l allocated to the radio receiver 10 are provided with reference signs in FIGS. 12a-d, whereas the reference signs 90a, b, d, e, g, h, and j are omitted in FIGS. 12a-d.

FIG. 12a illustrates the output signals from the CM $CM_1$ and the CSF $CSF_1$. FIG. 12a also includes a schematic illustration of the passband 310a of the CSF $CSF_1$. The control unit 60 (FIG. 4) controls the LO signal associated with the CM $CM_1$ such that the RB 90c, in the output signal from the CM $CM_1$, appears within the passband 310a of the CSF $CSF_1$. In the output signal from the CSF $CSF_1$, only the RB 90c is present, whereas the other RBs are removed (or at least significantly attenuated) by the CSF $CSF_1$. The passband 310a of the CSF $CSF_1$ appears at negative frequencies, and may thus be implemented as a complex BP filter. The passband 310a has a center frequency that is closer to 0 Hz than the center frequency of the RB 90c in the complex input signal (see FIG. 6). Hence, the CM $CM_1$ should perform a positive frequency translation, and the control unit 60 should control the LO signal associated with the CM $CM_1$ such that the phase of the I component of the LO signal is 90° ahead of the phase of the Q component.

FIG. 12b illustrates the output signals from the CM $CM_2$ and the CSF $CSF_2$. FIG. 12b also includes a schematic illustration of the passband 310b of the CSF $CSF_2$. The control unit 60 (FIG. 4) controls the LO signal associated with the CM $CM_2$ such that the RB 90f, in the output signal from the CM $CM_2$, appears within the passband 310b of the CSF $CSF_2$. In the output signal from the CSF $CSF_2$, only the RB 90f is present, whereas the other RBs are removed (or at least significantly attenuated) by the CSF $CSF_2$. The passband 310b of the CSF $CSF_2$ appears at negative frequencies, and may thus be implemented as a complex BP filter. The passband 310b has a center frequency that is farther away from 0 Hz than the center frequency of the RB 90f in the complex input signal (see FIG. 6). Hence, the CM $CM_2$ should perform a negative frequency translation, and the control unit 60 should control the LO signal associated with the CM $CM_2$ such that the phase of the Q component of the LO signal is 90° ahead of the phase of the I component.

FIG. 12c illustrates the output signals from the CM $CM_3$ and the CSF $CSF_3$. FIG. 12c also includes a schematic illustration of the passband 310c of the CSF $CSF_3$. The control unit 60 (FIG. 4) controls the LO signal associated with the CM $CM_2$ such that the RB 90i, in the output signal from the CM $CM_2$, appears within the passband 310c of the CSF $CSF_3$. In the output signal from the CSF $CSF_3$, only the RB 90i is present, whereas the other RBs are removed (or at least significantly attenuated) by the CSF $CSF_3$. The passband 310c of the CSF $CSF_2$ is centered around 0 Hz, and may thus be implemented with separate LP filters for the I and Q signal paths, e.g. as in FIG. 7. The RB 90i appears at positive frequencies in the complex input signal (see FIG. 6). Hence, the CM $CM_2$ should perform a negative frequency translation, and the control unit 60 should control the LO signal associated with the CM $CM_2$ such that the phase of the Q component of the LO signal is 90° ahead of the phase of the I component.

FIG. 12d illustrates the output signals from the CM $CM_4$ and the CSF $CSF_4$. FIG. 12d also includes a schematic illustration of the passband 310d of the CSF $CSF_4$. The control unit 60 (FIG. 4) controls the LO signal associated with the CM $CM_4$ such that the RBs 90k and l, in the output signal from the CM $CM_4$, appear within the passband 310d of the CSF $CSF_4$. In the output signal from the CSF $CSF_4$, only the RBs 90k and l are present, whereas the other RBs are removed (or at least significantly attenuated) by the CSF $CSF_4$. The passband 310d of the CSF $CSF_2$ appears at positive frequencies, and may thus be implemented as a complex BP filter. The passband 310d has a center frequency that is closer to 0 Hz than the center frequency of the combination of the RBs 90k and l in the complex input signal (see FIG. 6). Hence, the CM $CM_4$ should perform a negative frequency translation, and the control unit 60 should control the LO signal associated with the CM $CM_4$ such that the phase of the Q component of the LO signal is 90° ahead of the phase of the I component.

Also for the embodiment illustrated in FIG. 10, the CSFs $CSF_1$-$CSF_N$ may all be fixed filters, i.e. having fixed bandwidths and center frequencies. Alternatively, some or all of the CSFs $CSF_1$-$CSF_N$ may be controllable filters, e.g. having controllable bandwidths and/or center frequencies. The controllable filters may e.g. be controlled from the control unit 60.

In the example illustrated in FIGS. 12a-e, one of the CSFs (i.e. $CSF_3$) can be implemented as in FIG. 7, i.e. comprising a first and a second LP filter 100a and 100b for filtering the I and Q component, respectively, of the output signal of the CM $CM_3$, whereas the other CSFs are implemented as complex BP filters. In alternative embodiments, all of the CSFs $CSF_1$-$CSF_N$ are implemented as complex BP filters (i.e. none of the CSFs has a passband centered around 0 Hz).

As illustrated with the example in FIG. 12e, the processing device 40 may be arranged to process the complex input signal such that the frequency span in the compound complex signal between the lowest and the highest frequency of frequency translated subcarriers allocated to the radio receiver is narrower than the corresponding frequency span in the complex input signal between the lowest and the highest frequency of subcarriers allocated to the radio receiver. This facilitates relaxed bandwidth requirements on circuits (e.g. the ADCs 300) that follow after the adder circuit 260, e.g. compared with if these circuits were to operate directly on the complex signal which is input to the processing device 40. As in FIG. 12e, the processing device 40 may be adapted to process the complex input signal such that the compound complex signal comprises a continuous, or essentially continuous, frequency band comprising all of the subcarriers allocated to the radio receiver 10.

According to some embodiments, the processing device 40 may be comprised in a radio-receiver circuit (not shown). The radio receiver circuit may e.g. be comprised in the radio receiver 10.

An aspect that may need to be taken into account when implementing the processing device is the strength and/or shape of the LO signals driving the CMs $CM_1$-$CM_N$. Consider e.g. the example illustrated in FIGS. 6 and 8b. In the output signal of the CM $CM_2$ illustrated in FIG. 8b, only the RB 90f appears centered around 0 Hz. In an actual physical implementation of the processing device 40, also a residual of the RB 90g (i.e. the RB appearing at the image frequency of the RB90f) may appear centered around 0 Hz in the output signal of the CM $CM_2$ due to nonideal suppression of image signals in the CM $CM_2$. This residual will interfere with the RB 90f. Furthermore, due to nonlinearities, signal content in the input signal appearing at harmonics of the LO frequency may also to some extent be frequency translated to appear around 0 Hz and interfere with the RB 90f. In order to obtain a relatively high image suppression in the CM, the CM should be driven as a switching mixer. This could e.g. be obtained by using an LO signal with a square-wave shape or an approximate square-wave shape, or with a sinusoidal LO signal having a relatively high amplitude. On the other hand, in order to obtain a relatively low amount of interference from signal content appearing at harmonics of the LO frequency, the CM should be driven more like a multiplying mixer, ideally performing multiplication with a pure sinusoid. This may e.g. be obtained with an LO signal having a sinusoidal shape and a lower amplitude than if the CM were to be driven as a switching mixer with a sinusoidal LO signal. In view of the above, a trade-off may have to be made to determine an appropriate LO amplitude and/or shape. This trade-off may e.g. be made from implementation to implementation and may e.g. be based on circuit simulations and/or measurements.

For embodiments describe above, it has been stated that the mutual phase difference between the I and the Q components of the LO signals is 90°. Due to e.g. manufacturing inaccuracies, noise, and jitter, the mutual phase difference may deviate somewhat from 90° in an actual physical implementation of the processing device 40. Hence, a 90° mutual phase difference, when used in this specification, should not be interpreted strictly as exactly 90°, but rather as approximately or essentially 90°.

When the control unit 60 (FIGS. 4 and 10) applies changes to various parts of the processing device 40, e.g. changes frequencies and/or mutual phase differences of LO signals, varies bandwidth and/or center frequencies of CSFs, etc., transients may appear in the output of the processing device 40. In order to avoid significant impairment of the signal quality due to such transients, the control unit 60 may be adapted to apply said changes during the cyclic prefixes of the OFDM symbols.

In the examples of FIGS. 8a-d and 12a-e, only RBs allocated to the radio receiver 10 are passed through the processing device 40. In some situations, e.g. if the number of processing paths is smaller than the number of separate continuous ranges of subcarriers allocated to the radio receiver 10, one or more RBs not allocated to the radio receiver 10 may need to be allowed to pass through the processing device 40 as well. For example, in the example illustrated in FIGS. 6 and 8a-d, four separate continuous ranges of subcarriers allocated to the radio receiver 10 are present in the complex input signal of the processing device 40; the RB 90c, the RB90f, the RB 90i, and the combination of the RBs 90k and l. These four ranges of subcarriers are processed separately in four different processing paths, $P_1$-$P_4$. If only three processing paths were available in the processing device, one of the processing paths, e.g. $P_3$, may be controlled to process the complex input signal such that the combination of the RBs 90i-l were centered around 0 Hz in the output of the CM $CM_3$ and output from the CSF $CSF_3$ (which then would need to have a total passband bandwidth of $4f_{RB}$). In this situation, also the RB 90j, which is not allocated to the radio receiver 10, is allowed to pass through the processing device 40. However, even though not all RBs that are not allocated to the radio receiver 10 are suppressed by the processing device 40 in this situation, the processing device 40 nevertheless provides a relaxation of dynamic range and bandwidth requirements.

The embodiments of the processing device 40 described above are not intended limit the scope of the invention. Various variations and combinations of the embodiments may be made. For example, with reference to FIG. 10, instead of adding output signals from all paths to a single compound signal, only a subset of the output signals from the processing paths $P_1$-$P_N$ may be added in the adder circuit 260 for forming the compound complex signals, whereas some or all of the other paths are arranged e.g. as in FIG. 9. Alternatively or additionally, the processing device may comprise more than one adder circuit for forming more than one compound complex signal by adding output signals from different subsets of the processing paths $P_1$-$P_N$.

According to some embodiments a method of processing an analog complex input signal representing a sequence of OFDM symbols in the radio receiver 10 is provided. The method may be performed in the processing device 40. According to the method, control data is received. Furthermore, subcarrier locations, within at least one individual OFDM symbol of the sequence of OFDM symbols, of one or more RBs allocated to the radio receiver 10 are determined based on the control data. Furthermore, for each of a plurality of processing paths $P_1$-$P_N$, the complex input signal is frequency translated in a CM $CM_1$-$CM_N$ of the processing path $P_1$-$P_N$ based on an LO signal associated with and provided to the CM, and an output signal of the CM is filtered in an analog CSF $CSF_1$-$CSF_N$ of the processing path $P_1$-$P_N$. Moreover, for each of said at least one individual OFDM symbol, the LO signals associated with the CMs are controlled (e.g. from the control unit 60) based on the determined subcarrier locations and passbands of the CSFs $CSF_1$-$CSF_N$ such that each set of adjacent subcarriers, defined by RBs allocated to the radio receiver 10, within the OFDM symbol is frequency translated by a CM $CM_1$-$CM_N$ of the processing paths $CM_1$-$CM_N$ to appear within the passband of the following CSF $CSF_1$-$CSF_N$.

Figure 13:
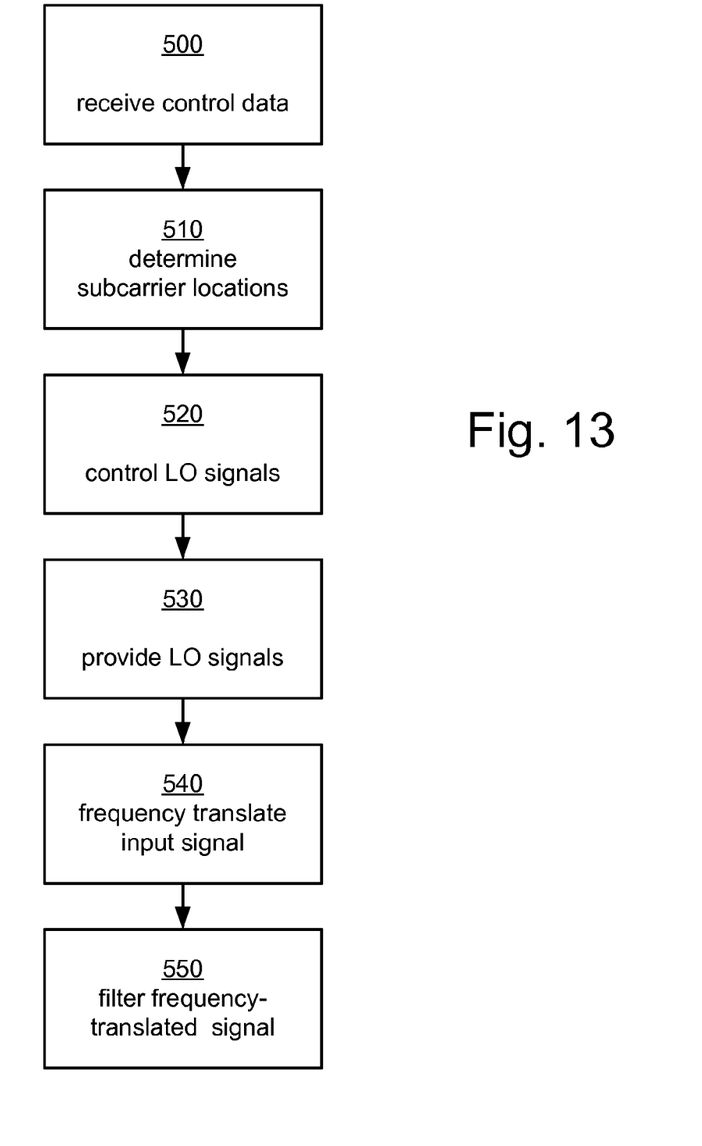
FIG. 13 is a flow chart of a method according to an embodiment of the present invention.

FIG. 13 is a flow chart of an embodiment of the method. In step 500, the control data is received. Furthermore, the subcarrier locations of the RBs allocated to the radio receiver 10 are determined based on the control data in step 510. In step 520, the LO signals are controlled, e.g. from the control unit 60, such that appropriate LO frequencies and mutual phase differences (e.g. +90° or −90°) between I and Q components of the LO signals are obtained. Step 520 may e.g. comprise changing one or more LO frequencies and/or one or more signs of mutual phase differences between I and Q components of LO signals based on subcarrier locations of RBs allocated to the radio receiver 10 and passbands of the CSFs of the processing device 40. This change may e.g take place during a cyclic prefix of an OFDM symbol. In step 530, the LO signals are provided to the CMs. In step 540, the complex input signal is frequency translated in the CMs. Moreover, the frequency translated signals output from the CMs are filtered by the CSFs in step 550.

It should be noted that although the steps 500-550 are illustrated as being performed in sequence in the flowchart of FIG. 13, some steps may be carried out in parallel. For example, steps 530-550 may represent continuously ongoing processes. Furthermore, variations of the embodiment illustrated in FIG. 13 are possible. For example, additional steps may be performed, such as but not limited to enabling or disabling processing paths, controlling passbands of the CSFs, adding output signals from processing paths for forming a compound signal, and/or converting output signals from the CSFs or the compound signal to digital representation in one or more ADCs, as has been described in the context of embodiments of the processing device 40. Moreover, the method, or parts thereof, may be repeated as necessary. For example, updating LO frequencies and/or mutual phase differences between I and Q components of LO signals in step 520 may be made several times based on the same control data, e.g. if subcarrier locations of RBs allocated to the radio receiver 10 varies between OFDM symbols of the same subframe in LTE. Furthermore, e.g. in an LTE scenario, the whole method illustrated by the flowchart in FIG. 13 (or variations thereof) may be repeated once for every subframe.

Embodiments of the invention enables tracking of and adaptation to current subcarrier locations of RBs allocated to the radio receiver 10. Thereby, bandwidth and/or dynamic range requirements of circuitry in the radio receiver 10, e.g. ADCs and/or filters, can be relaxed, in particular when the radio receiver 10 operates at relatively low data rates compared with the maximum available data rate, e.g. when only one or a few RBs are allocated to the radio receiver 10. Hence, the radio receiver 10 can be adapted to current utilization of the communication channel, whereby a reduced power consumption can be attained.

The present invention has been described above with reference to specific embodiments. However, other embodiments than the above described are possible within the scope of the invention. Different method steps than those described above, may be provided within the scope of the invention. The different features and steps of the embodiments may be combined in other combinations than those described. The scope of the invention is only limited by the appended patent claims.

The invention claimed is:

1. A processing device for processing an analog complex input signal representing a sequence of orthogonal frequency-division multiplexing (OFDM) symbols in a radio-receiver, the processing device comprising
a plurality of processing paths, wherein each processing path comprises:
a complex mixer configured to frequency translate the analog complex input signal based on a local oscillator signal associated with the complex mixer; and
an analog channel-selection filter operatively connected to an output port of the complex mixer and configured to filter an output signal of the complex mixer;
an oscillator unit configured to provide the local oscillator signal associated with the complex mixer of each of the processing paths; and
a control unit configured to
receive control data;
determine, based on the control data, subcarrier locations, within at least one individual OFDM symbol of the sequence of OFDM symbols, of one or more resource blocks allocated to the radio receiver, wherein a resource block defines a nonempty set of adjacent subcarriers for each of a nonempty set of consecutive OFDM symbols; and
for each of said at least one individual OFDM symbol, control the local oscillator signals associated with the complex mixers based on the determined subcarrier locations and passbands of the analog channel-selection filters such that each set of adjacent subcarriers, defined by the one or more resource blocks allocated to the radio receiver, within the OFDM symbol is frequency translated by a complex mixer of the processing paths to appear within the passband of the following analog channel-selection filter.

2. The processing device according to claim 1, wherein said complex input signal is a complex baseband signal essentially centered around 0 Hz.

3. The processing device according to claim 1, wherein the analog channel-selection filter in each processing path comprises:
a first low-pass filter for filtering an in-phase (I) component of the output signal of the complex mixer of the processing path; and
a second low-pass filter for filtering a quadrature (Q) component of the output signal of the complex mixer of the processing path.

4. The processing device according to claim 3, wherein each processing path comprises:
a first analog-to-digital converter operatively connected to an output terminal of the first low-pass filter of the processing path for converting the filtered I component to a digital representation; and
a second analog-to-digital converter operatively connected to an output terminal of the second low-pass filter of the processing path for converting the filtered Q component to a digital representation.

5. The processing device according to claim 1, wherein the passbands of the channel-selection filters are mutually essentially nonoverlapping and wherein the processing device further comprises an adder circuit for adding output signals of the channel-selection filters for forming a compound complex signal.

6. The processing device according to claim 5, wherein the analog channel-selection filter of one of the processing paths comprises:
a first low-pass filter for filtering an in-phase (I) component of the output signal of the complex mixer of said one of the processing paths; and
a second low-pass filter for filtering a quadrature (Q) component of the output signal of the complex mixer of said one of the processing paths; and
wherein the analog channel-selection filters of the other processing paths comprise complex bandpass filters.

7. The processing device according to claim 5, wherein the analog channel-selection filter of each processing path comprises a complex bandpass filter.

8. The processing device according to claim 5, wherein the processing device is configured to, for each of said at least one individual OFDM symbol, process the complex input signal such that the frequency span in the compound complex signal between the lowest and the highest frequency of frequency translated subcarriers allocated to the radio receiver is narrower than the corresponding frequency span in the complex input signal between the lowest and the highest frequency of subcarriers allocated to the radio receiver.

9. The processing device according to claim 8, wherein the processing device configured to, for each of said at least one individual OFDM symbol, process the complex input signal such that the compound complex signal comprises an essentially continuous frequency band comprising all of the subcarriers allocated to the radio receiver.

10. The processing device according to claim 5, wherein the processing device further comprises analog-to-digital converters for converting an in-phase (I) and a quadrature (Q) component of the compound complex signal to digital representations.

11. The processing device according to claim 1, wherein the control unit is configured to control the passbands of the channel-selection filters in response to the received control data.

12. A radio-receiver circuit comprising a processing device for processing an analog complex input signal representing a sequence of orthogonal frequency-division multiplexing (OFDM) symbols in the radio-receiver circuit, the processing device comprising
    a plurality of processing paths, wherein each of the processing paths comprises:
        a complex mixer configured to frequency translate the analog complex input signal based on a local oscillator signal associated with the complex mixer; and
        an analog channel-selection filter operatively connected to an output port of the complex mixer and configured to filter an output signal of the complex mixer;
    an oscillator unit configured to provide the local oscillator signal associated with the complex mixer of each of the processing paths; and
    a control unit configured to
        receive control data;
        determine, based on the control data, subcarrier locations, within at least one individual OFDM symbol of the sequence of OFDM symbols, of one or more resource blocks allocated to the radio-receiver circuit, wherein a resource block defines a nonempty set of adjacent subcarriers for each of a nonempty set of consecutive OFDM symbols; and
        for each of said at least one individual OFDM symbol, control the local oscillator signals associated with the complex mixers based on the determined subcarrier locations and passbands of the analog channel-selection filters such that each set of adjacent subcarriers, defined by the one or more resource blocks allocated to the radio-receiver circuit, within the OFDM symbol is frequency translated by a complex mixer of the processing paths to appear within the passband of the following analog channel-selection filter.

13. An electronic apparatus comprising a processing device for processing an analog complex input signal representing a sequence of orthogonal frequency-division multiplexing (OFDM) symbols in a radio receiver associated with the electronic apparatus, the processing device comprising
    a plurality of processing paths, wherein each of the processing paths comprises:
        a complex mixer configured to frequency translate the analog complex input signal based on a local oscillator signal associated with the complex mixer; and
        an analog channel-selection filter operatively connected to an output port of the complex mixer and configured to filter an output signal of the complex mixer;
    an oscillator unit configured to provide the local oscillator signal associated with the complex mixer of each of the processing paths; and
    a control unit configured to
        receive control data;
        determine, based on the control data, subcarrier locations, within at least one individual OFDM symbol of the sequence of OFDM symbols, of one or more resource blocks allocated to the radio receiver, wherein a resource block defines a nonempty set of adjacent subcarriers for each of a nonempty set of consecutive OFDM symbols; and
        for each of said at least one individual OFDM symbol, control the local oscillator signals associated with the complex mixers based on the determined subcarrier locations and passbands of the analog channel-selection filters such that each set of adjacent subcarriers, defined by resource blocks allocated to the radio receiver, within the OFDM symbol is frequency translated by a complex mixer of the processing paths to appear within the passband of the following analog channel-selection filter.

14. The electronic apparatus according to claim 13, wherein the electronic apparatus comprises a portable radio communication equipment, a mobile radio terminal, a mobile telephone, a communicator, an electronic organizer, a smartphone, or a computer.

15. A method of processing an analog complex input signal representing a sequence of orthogonal frequency-division multiplexing (OFDM) symbols in a radio receiver, the method comprising:
    receiving control data;
    determining, based on the control data, sub-carrier locations, within at least one individual OFDM symbol of the sequence of OFDM symbols, of one or more resource blocks allocated to the radio receiver, wherein a resource block defines a nonempty set of adjacent subcarriers for each of a nonempty set of consecutive OFDM symbols;
    for each of a plurality of processing paths:
        frequency translating the analog complex input signal in a complex mixer of the processing path based on a local oscillator signal associated with the complex mixer; and
        filtering an output signal of the complex mixer in an analog channel-selection filter of the processing path;
    providing the local oscillator signal associated with the complex mixer of each of the processing paths; and
    for each of said at least one individual OFDM symbol, controlling the local oscillator signals associated with the complex mixers based on the determined subcarrier locations and passbands of the analog channel-selection filters such that each set of adjacent subcarriers, defined by the one or more resource blocks allocated to the radio receiver, within the OFDM symbol is frequency translated by a complex mixer of the processing paths to appear within the passband of the following analog channel-selection filter.

\* \* \* \* \*

UNITED STATES PATENT AND TRADEMARK OFFICE
CERTIFICATE OF CORRECTION

PATENT NO.           : 8,594,213 B2
APPLICATION NO.      : 13/001765
DATED                : November 26, 2013
INVENTOR(S)          : Sundström et al.

Page 1 of 1

It is certified that error appears in the above-identified patent and that said Letters Patent is hereby corrected as shown below:

On the Title Page, item (12), under "United States Patent", in Column 1, Line 1, delete "Sundstrom" and insert -- Sundström --, therefor.

On the Title Page, item (75), under "Inventors", in Column 1, Line 1, delete "Lars Sundstrom," and insert -- Lars Sundström, --, therefor.

On the Title Page, item (22), under "PCT Filed", in Column 1, Line 1, delete "Jun. 1, 2009" and insert -- Jul. 1, 2009 --, therefor.

Signed and Sealed this
Twenty-ninth Day of July, 2014

Michelle K. Lee
*Deputy Director of the United States Patent and Trademark Office*